Figure 14:
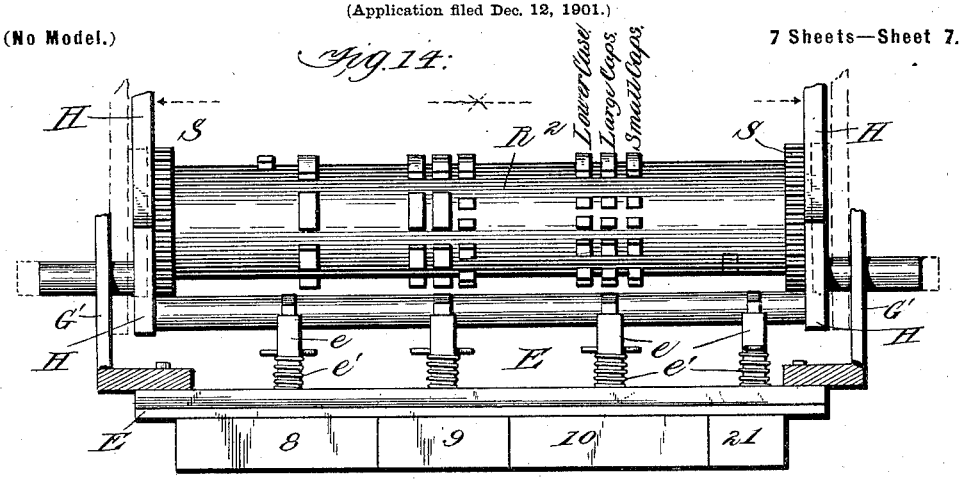

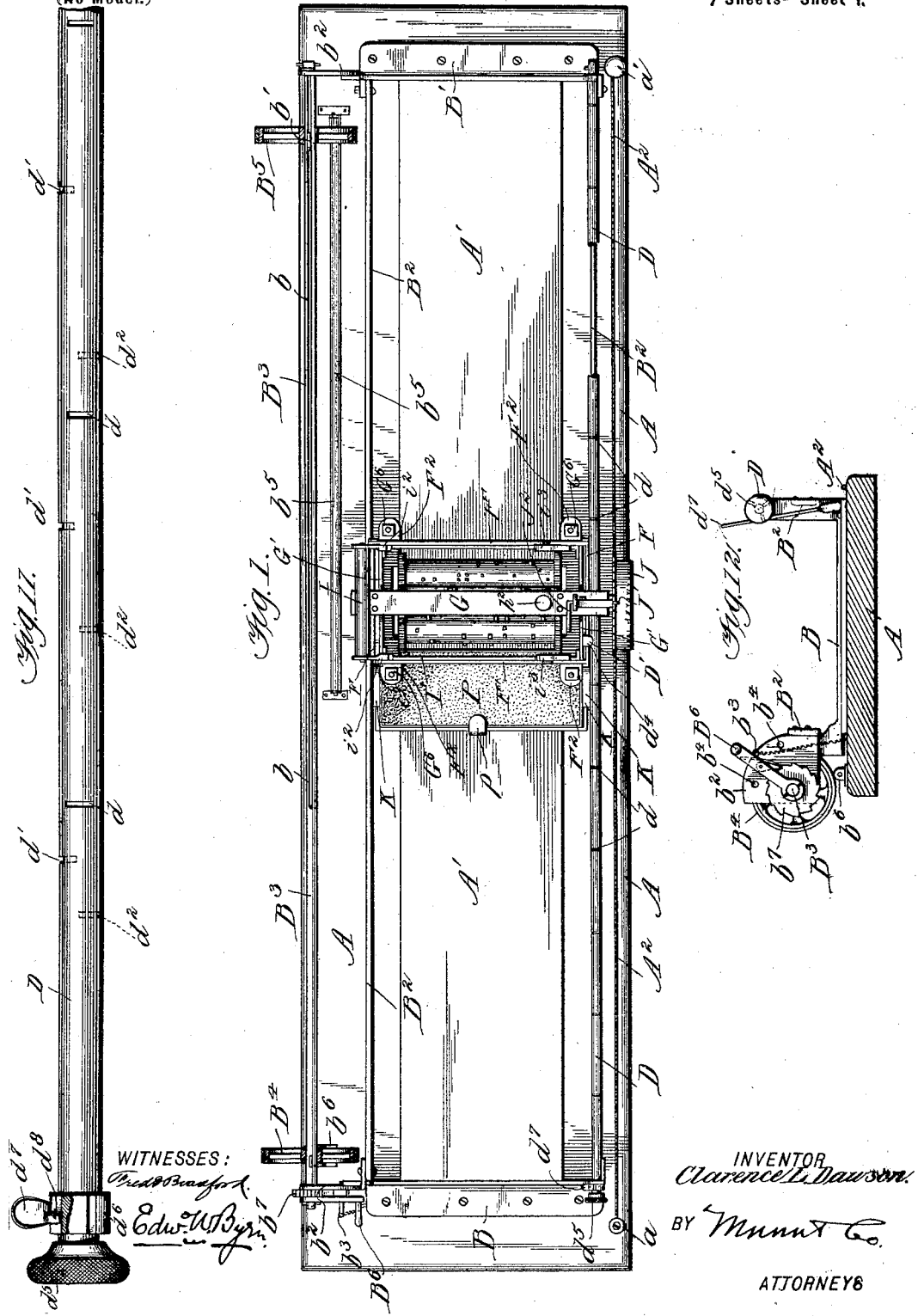

No. 699,496. Patented May 6, 1902.
C. L. DAWSON.
UNIVERSAL PRINTING MACHINE.
(Application filed Dec. 12, 1901.)
(No Model.) 7 Sheets—Sheet 2.
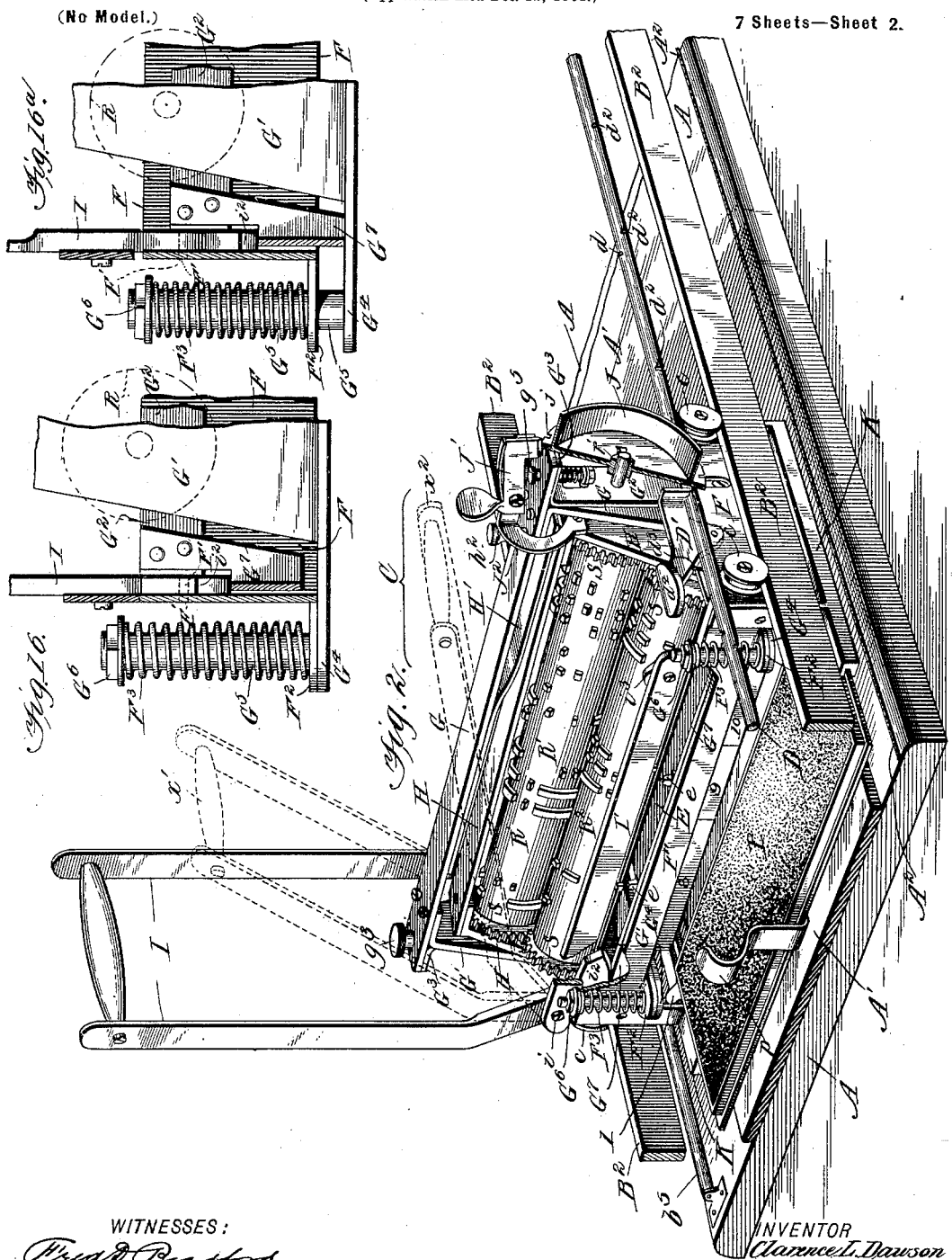
WITNESSES:
INVENTOR
Clarence L. Dawson
BY
ATTORNEYS No. 699,496. Patented May 6, 1902.
C. L. DAWSON.
UNIVERSAL PRINTING MACHINE.
(Application filed Dec. 12, 1901.)
(No Model.) 7 Sheets—Sheet 3.
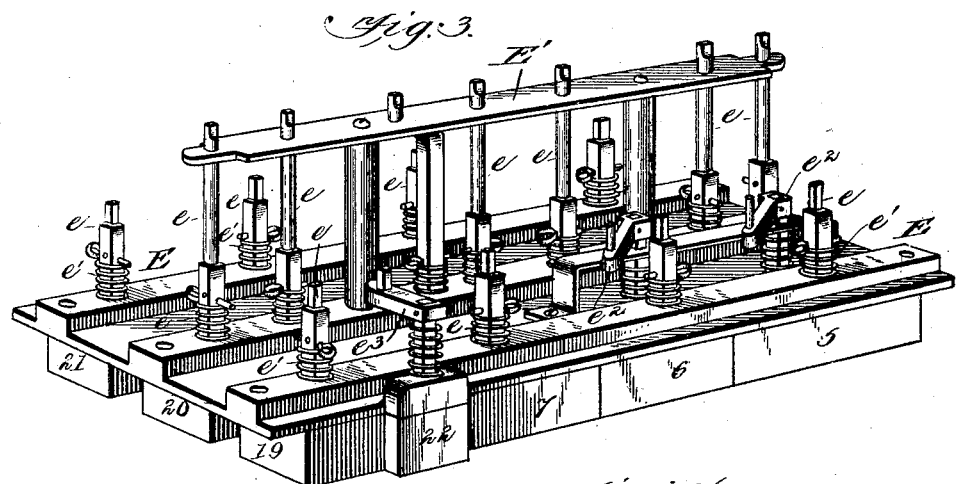
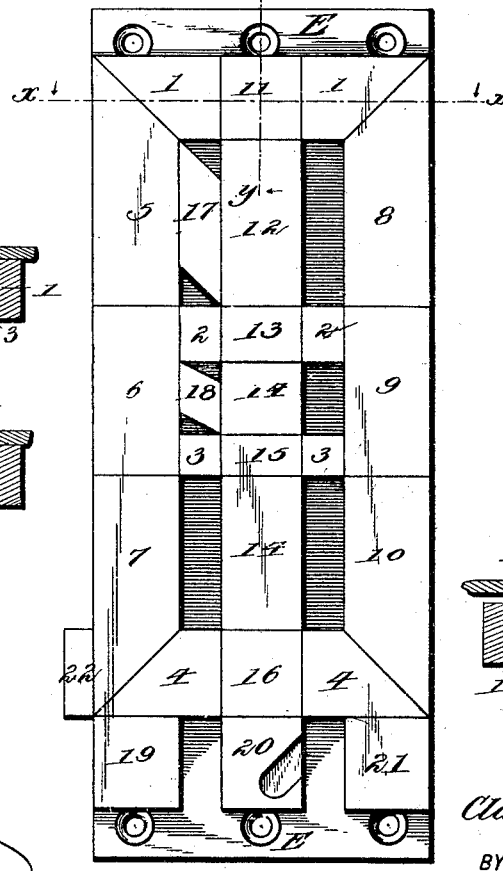
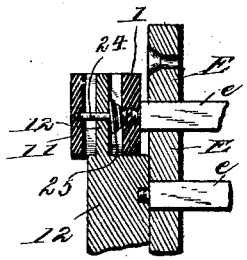
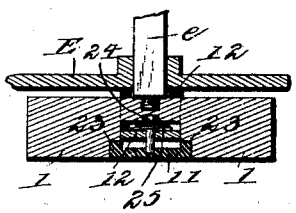
WITNESSES:
INVENTOR
Clarence L. Dawson.
BY Munn & Co.
ATTORNEYS No. 699,496. Patented May 6, 1902.
C. L. DAWSON.
UNIVERSAL PRINTING MACHINE.
(Application filed Dec. 12, 1901.)
(No Model.) 7 Sheets—Sheet 4.
Fig. 8.
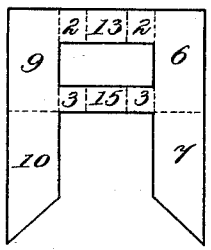 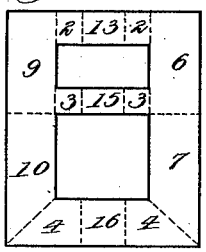 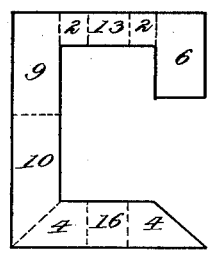
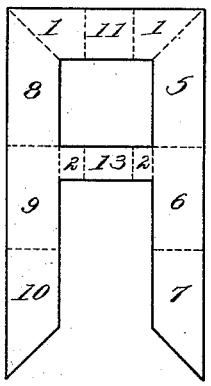 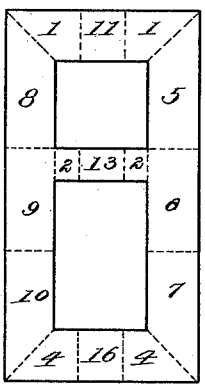 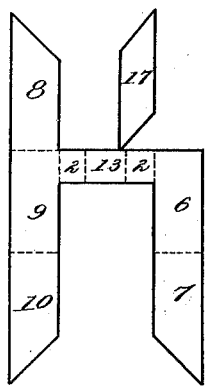
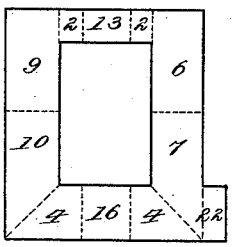 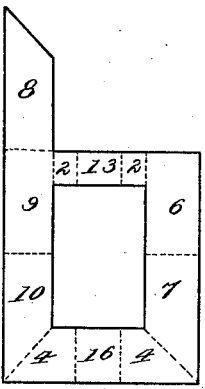 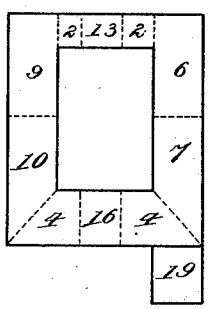
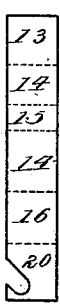 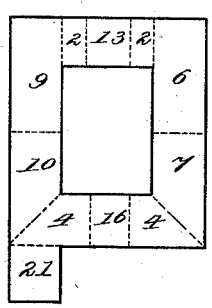
WITNESSES:
Fred P. Bradford
Edw. W. Byrn
INVENTOR
Clarence L. Dawson
BY Munn & Co.
ATTORNEYS No. 699,496. Patented May 6, 1902.
C. L. DAWSON.
UNIVERSAL PRINTING MACHINE.
(Application filed Dec. 12, 1901.)
(No Model.) 7 Sheets—Sheet 5.
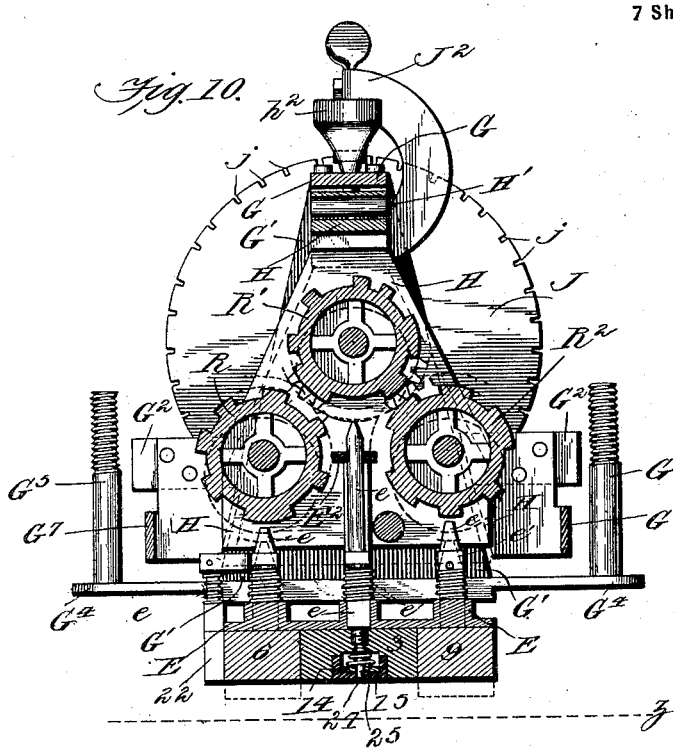
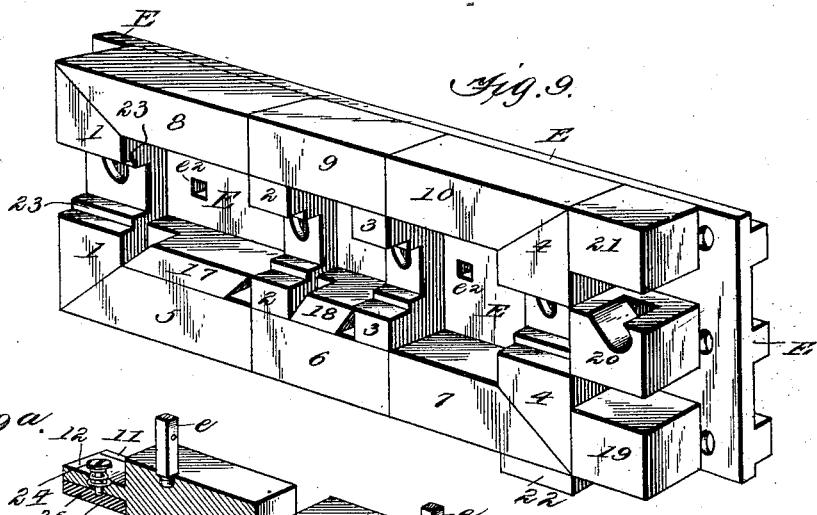
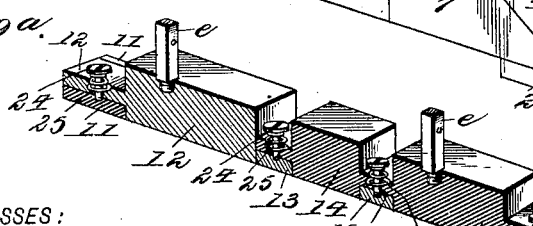
WITNESSES:
Fred P. Bradford
Edw. W. Byrn
INVENTOR
Clarence L. Dawson
BY Munn & Co.
ATTORNEYS No. 699,496. Patented May 6, 1902.
C. L. DAWSON.
UNIVERSAL PRINTING MACHINE.
(Application filed Dec. 12, 1901.)
(No Model.) 7 Sheets—Sheet 6.
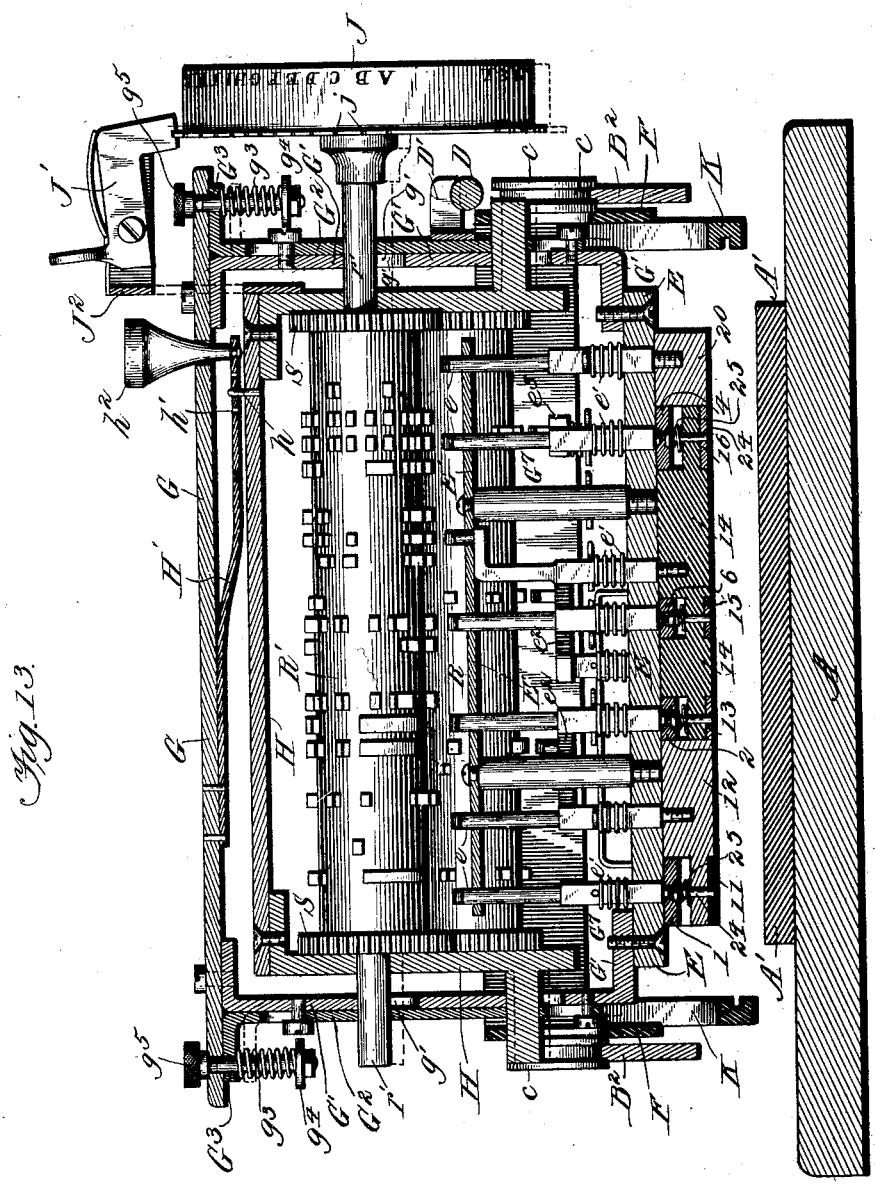
WITNESSES:
INVENTOR
Clarence L. Dawson.
BY
ATTORNEYS No. 699,496. Patented May 6, 1902.
C. L. DAWSON.
UNIVERSAL PRINTING MACHINE.
(Application filed Dec. 12, 1901.)
(No Model.) 7 Sheets—Sheet 7.

WITNESSES:
INVENTOR
Clarence L. Dawson.
BY
ATTORNEYS

UNITED STATES PATENT OFFICE.

CLARENCE LINCOLN DAWSON, OF JACKSONVILLE, ILLINOIS, ASSIGNOR OF ONE-HALF TO WALTER H. GRAHAM, OF JACKSONVILLE, ILLINOIS, AND FRANK McCUDDY, OF CLINTON, ILLINOIS.

UNIVERSAL PRINTING-MACHINE.

SPECIFICATION forming part of Letters Patent No. 699,496, dated May 6, 1902.

Application filed December 12, 1901. Serial No. 85,657. (No model.)

*To all whom it may concern:*

Be it known that I, CLARENCE LINCOLN DAWSON, of Jacksonville, in the county of Morgan and State of Illinois, have invented a new and useful Improvement in Universal Printing-Machines, of which the following is a specification.

The object of my invention is to provide, for the use of stores, real-estate agents, and others, a universal machine for quickly and cheaply printing announcements in letters of large size in the form of bulletins, cartoons, &c. Such work is ordinarily done by hand by a paint-brush and requires a skilful and rapid painter.

The purpose of my invention is to provide a machine for doing this whereby persons unskilled in either painting or printing may readily and neatly produce the various signs and bulletins required in their business. My invention is designed to reduce such an apparatus to the simplest proportions and to do away entirely with the large array of movable type; and to that end it comprehends a universal letter-type which is so constructed and arranged in separate sections as to be capable of printing any letter or numeral by a selective action which brings into printing position such of the fragmental sections as are required for any particular letter or numeral and leaving out of action such other of the sections of the universal letter-type as are not required. A movable carriage travels on guides over a subjacent paper-holding and paper-feeding device, selecting-rolls are adjusted to various positions in the carriage to effect the selection of the letter-segments, a depressing mechanism brings the selected letter-segments into position to be inked and by a second motion into printing contact with the paper, and spacing and feed mechanism control the movements of the selecting-rolls through the carriage and also the advance of the carriage over the paper-holding devices.

My invention consists in the novel construction and arrangement of these various parts of such universal printing-machine, which I will first fully describe with reference to the drawings, and then specifically point out in the claims.

Figure 15:
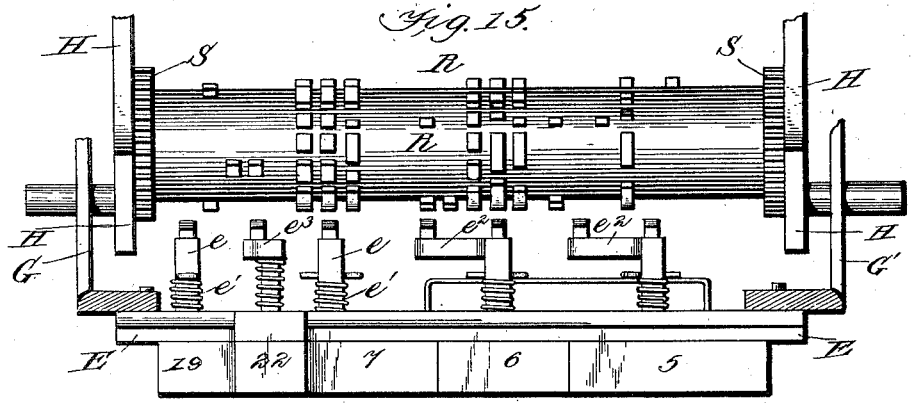

Figure 1 is a plan view of the entire machine. Fig. 2 is an enlarged perspective view of the printing mechanism and carriage supporting the same. Fig. 3 is a perspective top side view, and Fig. 3$^a$ a face view, of the universal letter-type which forms the bottom part of the printing mechanism. Figs. 4, 5, and 7 are detail sections on line $x\,x$ of Fig. 3$^a$, showing different positions of the printing type-segments. Fig. 6 is a detailed section on line $y\,y$ of Fig. 3$^a$, showing a different position of the printing type-segments. Fig. 8 shows the different styles of letters printed by my machine. Fig. 9 is a perspective view of the under side of the universal letter-type with some of the segments removed and laid down at Fig. 9$^a$. Fig. 10 is a vertical cross-section through the printing mechanism. Fig. 11 is an enlarged detail of the spacing-bar. Fig. 12 is an end elevation of the left-hand end of Fig. 1. Fig. 13 is a vertical longitudinal section taken through the middle of the printing-carriage. Fig. 14 is a side view of the roller R, seen in Fig. 10 and in proper relation to the subjacent printing segments which it controls. Fig. 15 is a similar view of the roller R$^2$ on the opposite side in relation to the printing-segments which it controls; and Figs. 16 and 16$^a$ are sectional details of a corner of the printing-carriage, showing different positions of its parts.

I will first describe the paper-feeding devices, the frame on which the printing-carriage is supported and adjusted, and the spacing devices for regulating the throw of the carriage on its guide-rails for successively printing the consecutive letters, reference being had more more especially to Figs. 1, 2, and 12.

A represents an elongated table or stand, preferably made of wood and long enough to accommodate the maximum width of bulletin or bill-poster to be printed. At each end of this table there is mounted a metal frame B and B', the middle portions of which lie flat upon the table and the end portions of which frames rise a short distance above the table and support two parallel rails B$^2$ B$^2$, Fig. 2, which extend the full length of the table and constitute the track upon which the printing-carriage C is supported and adjusted by means of small flanged wheels c. Behind the rearward track-rail in parallel position is arranged a rotary shaft $B^3$, carrying at one end a fixed feed-roll $B^4$ and at the other end an adjustable feed-roll $B^5$. Both these rolls have rubber faces and serve to pull the sheet of paper through by frictional contact. The adjustable roll $B^5$ is connected to the shaft $B^3$ for rigid rotary movement, but is capable of sliding on it by means of a longitudinal groove $b$, cut along the shaft and receiving a key $b'$, held on the hub of the pulley. The shaft $B^3$ is journaled in wings $b^2 b^2$, projecting rearwardly from the metal frames B B' at each end, and said shaft has at one end a crank-handle $B^6$, by means of which the two rolls are turned and the paper sheet fed through the machine when a new row of lettering is to be started. As my printing-machine contemplates the use of three different sizes of type, the throw of the feed-pulleys is made adjustable to suit, and for this purpose a pin $b^3$ is placed in one of a series of holes $b^4$ in Fig. 12 in the quadrantal plate near the crank and which pin when adjusted in any one of the series of holes acts as a stop to the crank-handle to arrest its motion sooner or later, and thus limit the feed of the paper to suit the size of the letter. A ratchet and pawl $b^7$ imparts the throw of the crank to the shaft. The paper sheet as fed through is caught between the rubber-faced pulley above and two subjacent rollers $b^6 b^5$, one of which, $b^5$, is made long enough—say half the length of the table—to accommodate the different widths of the sheets of paper used, the length of this roller equalling the range of the adjustment of the adjustable pulley $B^5$.

The paper as it lies upon the table rests upon a subjacent pad A', formed of any suitable soft material, and at the front edge of the table where the paper passes under the front rail there is stretched a tense wire or cable $A^2$, which is fixedly secured at one end by a screw $a$ and at the other end is connected to a tension-regulating screw $a'$. This serves to hold the paper flat and to smooth out wrinkles and creases as it passes under this wire and over pad A' and beneath the printing devices.

As the carriage is fed along the paper in printing a line it of course is necessary that it should be successively fed each time a distance dependent upon the size of the letter, and as I have arranged my printing device to print three different sizes of letter I have provided a spacing device for making the spacing to suit the size or kind of letter employed, the spacing being equal to the width of the letter and the space to occur between the impressions. For this purpose I arrange in front of the machine a rod D, Figs. 1, 2, 11, which is rotatably mounted in the tops of the two front posts of the metal end frames B B'. This rod has three series of transverse notches or kerfs cut into it, one series $d$, (see Fig. 11,) being for the widest letter, the next series $d'$ for the middle-size letter, and the other series $d^2$ for the smallest letter. The interval between the series $d'$ is shorter than $d$, and the interval between the series $d^2$ is shorter than $d'$. The three series of notches are cut at a relatively different portion of the periphery of the rod, so that one set $d$ is brought into engagement with a locking-latch D', Fig. 2, in one position of the rod, and when the other series $d'$ is to be brought into range of engagement with the said latch the rod is rotated slightly—say one-third of a revolution—and when the other series $d^2$ is to be brought into range of engagement with the latch the rod is rotated a third farther. The locking-latch D' is pivotally mounted on the end frame of the printing-carriage and is normally held into engagement with the locking-notches by a spring $d^3$ and is lifted out of engagement by pressure on a thumb-piece $d^4$. To rotate the spacing-rod, a knob $d^5$, Figs. 1, 11, 12, is attached to one end and has a boss $d^6$ notched at three places on its periphery to receive a tooth $d^8$ on a vertical spring-lever $d^7$, which springs into the notches, but may be withdrawn to permit the rod to be turned when a new series of spacing-notches are to be brought into coaction with the locking-latch on the carriage.

I will now describe the universal letter-type, which has a printing-face composed of a number of independently-movable segments, different members of which are consecutively brought into relief to form the various letters and numerals. The letter-type which I have shown in my drawings is designed to print three alphabets in three different kinds of type and the nine digits of the numerals. The universal letter-type is shown in Fig. $3^a$ and the three kinds of letters which it prints are shown in Fig. 8, in which small capitals appear at the top, large capitals in the second row, and lower-case or small letters at the bottom.

The separate movable segments of the letter-type are numbered from 1 to 22 in Fig. $3^a$, and by grouping these into various combinations and projecting them into relief they may be made to form any or all of the three sets of letters and the one set of numerals. In Fig. 8 the numbered portions of the letters correspond to the numbered segments of the letter-type, these letters being formed by printing from such segments of the type-letter as correspond to these numbers and which are brought into relief to receive the ink, while the other segments remain in their normal plane behind the advanced segments.

In Fig. $3^a$ the segment 17 is employed to form the capital letter "K," as seen in Fig. 8, and the segment 18 of Fig. $3^a$ serves the same purpose in the small letter "k." The segments 19, 20, 21, and 22 are used in forming parts of the small letters, as shown at the bottom of Fig. 8. To form the letter "X," the segments 8 2 13 2 6 7 and 11 12 14 15 14 16 are used. To form the letter "Y," the segments 5 8 2 13 2 14 15 14 16 are used. To form "Z," 1 11 1 17 2 13 2 6 7 4 16 4 are used. These letters, it will be seen, are not strictly conventional, but are close enough to be easily read in the printed context. The other letters more easily suggest their formation.

Most of the letter-segments act singly and independently, but some of them act in pairs. Thus, for instance, 1 1, 2 2, 3 3, 4 4, and 14 14 always act in pairs and are in fact twin sections formed in one piece, as seen in Figs. 9 and 9ª. There are some of the segments also that operate interchangeably with other segments in forming different letters. Thus segment 11 may act with 1 and 1 in forming letter "E" or it may separate itself from 1 and 1 and act with 12 in forming the letter "I." So, also, 13 acts either with 12 and 14 or with 2 and 2, 15 acts either with 14 and 14 or with 3 and 3, and 16 acts either with 14 and 20 or with 4 and 4. This is fully explained in Figs. 4, 5, 6, 7, 9, and 9ª, in which Figs. 4, 5, and 7 are sections on line $x\ x$ of Fig. 3ª and Fig. 6 a section on line $y\ y$ of Fig. 3ª. Fig. 4 shows all the segments flush. Fig. 5 shows segment 11 acting with the vertical member 12, and Figs. 6 and 7 show segment 11 acting with the twin member 1 and 1. To explain how this is accomplished, the segment 11 is a flanged shell seated in the notch between the twin segment 1 and 1, (see Figs. 5 and 9,) and said twin segment has shoulders 23 23, which push 11 forward whenever twin segment 1 1 is advanced, as in Fig. 6 and 7. This shell 11 has a headed pin 24, that passes through the reduced end of segment 12, and has behind said segment and beneath the head of the pin a coil-spring 25. Now if segment 12 be advanced it pushes segment 11 with it, as in Fig. 5. When the twin segment 1 1 is advanced along with 11, as in Figs. 6 and 7, and 12 remains back, the spring 25 is compressed and serves to draw 1 1 and 11 back again. It will thus be seen that 11 may act either with twin segment 1 1 or with 12. The same construction and arrangement exists between all the other twin segments and the interchangeable segments—that is, between the twin sections 2 2, 3 3, and 4 4 and the interchangeable or bridge segments 13 15 16, the joints being similar to those shown in Figs. 4 to 7, already described.

The letter-type is of a generally rectangular shape, and its printing-blocks join onto each other at the corners with miter-joints, and the adjacent faces of the blocks are adapted to form a continuous printing-surface when desired.

Each of the movable segments has attached to its back or upper side an operating-stem $e$, Fig. 3, which is square in cross-section, and it passes through a square hole $e^2$ in a back plate E, Fig. 9, so that the segments are held true against turning, and these stems have above the back plate coil-springs $e'$, wound around the stems and bearing against a cross-pin, and which springs serve to individually lift each segment after it has been depressed to a printing position in relief. These stems are all arranged in three rows, so as to bring them within the range of three selecting-rollers R R' R², as shown in Fig. 10. For compactness the middle one of these rollers is in a higher plane than the other two, and the middle row of segment-stems is carried up higher, so as to reach the range of contact of the higher middle roller, as seen in Figs. 3 and 10. To bring some of the stems of the letter-segments immediately below the rollers, some of said stems are formed with offsetting cranks $e^2\ e^2\ e^3$, with pins on their free ends, so that all the segment-stems can be alined in three parallel rows immediately below the three rollers. These rollers are formed with lugs or projections on their peripheries, and their function is to select which ones of the segments are to print, the projections on the rollers being so arranged that rotary action brings the proper projections on the rollers immediately above the depressible stems of the segments. When this occurs, a descent of the rollers follows in two motions. The first motion causes the rollers to descend upon the segment-stems and to select and push down those that are to form the letter, as indicated by dotted lines in Fig. 10, and then all the parts shown in Fig. 10 descend together to printing impact with the paper shown at the dotted lines $x$.

To render the foregoing action clear, it will be first necessary to explain fully the construction and arrangement of the parts of the carriage and the elements coacting with these parts, reference being had more especially to Figs. 2, 13, 16, and 16ª. The carriage has a rectangular frame composed of horizontal end bars F F, that carry the wheels or rollers $c\ c$, that travel on the rails B² B², and side bars F' F', rigidly connected to the said end bars. This portion of the carriage travels horizontally, but has no up-and-down motion. Inside the rectangular frame there is another compound frame carrying the selecting-rollers R R' R², (seen in Fig. 10,) all of which moves up and down with a compound motion, as will be hereinafter more fully described. This compound frame (see Fig. 13) consists of a horizontal top bar G, rigidly attached to vertical end plates G' G', which latter are slotted vertically, as at $g'$, to permit the journals of the three rollers R R' R² to pass through and have a vertical motion in said slots. One of said journals $r'$ is shown in said Fig. 13. Outside of the vertical end plates G' G' are other parallel vertical plates G² G², through which the said journals of the rollers pass in closely-fitting bearings, so that these end plates G² move vertically with the rollers. The plates G², with the rollers, move down in relation to plate G' and are lifted again by springs, as follows: Lugs G³ G³ extend outwardly from the tops of plates G² and bear upon coil-springs $g^3$, which latter rest upon washers $g^4$, fixed to the lower ends of pins $g^5$, adjustably fixed in the ends of the top bar G, so that when the roller-shafts, with end plates $G^2$ and lugs $G^3$, descend, as shown in dotted lines, the springs $g^3$ will be compressed and when released will again lift end plates $G^2$ and roller-journals in relation to plates $G'$, through whose slots the said journals pass. This is the first part of a compound motion, and its action is to bring the rollers, with their selecting projections, into contact with the tops of the segment-stems $e$ to select the particular segments that are to print, the back plate E being rigidly attached to the end plates $G'$ $G'$, which have not yet moved. This initial movement of the rollers to select the letter-segments is shown in dotted lines in Fig. 10. After the letter-segments have been selected then a continuation of the downward motion carries both end plates $G'$ $G'$ and $G^2$ $G^2$, the rollers, and the printing-type and back plate E all down together on the paper to make the impression. I will now describe how this compound downward movement is effected, referring first to Fig. 2. I is a bail-shaped lever, whose two lever-arms are fulcrumed at $i$ and have below the fulcrum cams $i^2$, which when the lever is deflected, as shown in dotted lines, bear upon the inner frame-bars $G^7$ and force them down. The frame-bars $G^7$, of which there is one on each side of the machine, are connected to the outside vertical frame $G^2$, as seen in Figs. 16 and 16$^a$, and the part $G'$ has at each corner a horizontal extension $G^4$, with a vertical pin $G^5$ on its end, having a head $G^6$, that bears upon a coil-spring $F^3$, mounted upon a step $F^2$, projecting from the relatively stationary parts $F'$ $F'$ of the carriage-frame. These springs $F^3$ are the last ones to come into action and permit the descent of the whole of the printing apparatus, and they act as follows: When lever I is deflected, (see Figs. 2, 16, and 16$^a$,) the cams $i^2$ force down bars $G^7$. For the first part of this descent the bars $G^7$ do not touch the arms $G^4$, as will be seen from Fig. 16. During this first part of the lever's motion (shown by dotted position $x'$, Fig. 2) the frame $G^2$, Fig. 13, moves down independently of $G'$, compressing springs $g^3$, as shown in dotted lines in Fig. 13, and this causes the rollers to make selection of the type-segments, as shown in dotted lines in Fig. 10. As soon as this selection is made and the lever I is moved from $x'$ to $x^2$ in Fig. 2 then the bar $G^7$ reaches arm $G^4$ (see Fig. 16$^a$) and carrying it down compresses spring $F^3$, when the whole of the printing apparatus—i. e., the end frames $G^2$, with the rollers, and end frames $G'$, with the printing-type—all descend together to give an impression on the paper of the selected printing-segments.

In order that the frames $G^2$ $G^7$, Fig. 16$^a$, may be acted upon at all four corners by the bail-shaped lever, the arms of the latter (see Fig. 2) are connected to horizontal bars $I'$, which at their other ends carry at $i^3$ cams similar to those shown at $i^2$ and which are tilted by the action of the parallel-motioned bars $I'$ whenever the bail-shaped lever I is depressed.

It will be understood that the rollers R R' $R^2$ are turned to a new position for every letter or numeral selected by them, and the projections on the periphery of the same are so carefully predetermined and constructed that when turned they bring the proper projections into range of engagement with the subjacent printing-segment stems. For this purpose the rollers have intermeshing gear-wheels S on their ends for an equal and simultaneous rotary adjustment, and this adjustment is made (see Fig. 13) by extending one of the journals $r'$ of the top roller R' to the outside of the frame and mounting thereon an indicator-wheel J. This has on its periphery an index of the various letters and numerals and at one edge a notched flange $j$, the notches of which bear an exact relation to the letters or numerals. A locking-latch J', pivotally mounted on a curved arm $J^2$, projecting from the frame H, is arranged to drop into any one of the notches of the flange on the index-wheel, and when said latch enters the notch opposite any letter or numeral the rollers are then in position to make selection of the printing-segments to form that letter.

I will now describe how the various fonts or kinds of type are used at will, as seen in Fig. 8. Within the frame G G' $G^2$ there is (see Fig. 13) another frame H, which immediately incloses the selecting-rollers and has journal-bearings for the same. Now assuming that there are three kinds of letters to be available, as in Fig. 8, I construct and arrange the selecting-rollers as follows, (see Fig. 14:) I arrange the projections on the rollers in three circular groups for each segment-stem $e$. One group will be for small capitals, as at the top of Fig. 8. The next will be for large capitals, as in the middle of Fig. 8, and the third group would be for lower-case or small letters, as at the bottom of Fig. 8. Now to bring any one of these groups into coactive relation to their common subjacent segment-stem $e$ the frame H, with all the rollers, is shifted longitudinally, as shown in dotted lines in Fig. 14, to bring the proper series of projections into range of the segment-stem $e$, the latter, with the printing-segments, remaining stationary. To lock the frame H to this adjustment, a spring-bar H' (see Fig. 13) is formed with three holes $h'$, adapted to lock over a pin $h$ in the top of frame H. This spring-bar H' is secured at one end to the frame G and at the other end has a knob $h^2$, by which it may be lifted to release the pin $h$ when frame H is to be shifted horizontally.

I will now describe the means for inking the type-letters, reference being had to Figs. 1, 2, and 13. K K, Fig. 13, are horizontal grooved guideways connected to the frame-pieces F F at a level between the pad A' and the type-letter. In the grooves of these guideways there slides the edges of an inking-pad P, which has a handle $p$, Fig. 2, by which the pad may be slid under the type-letter or withdrawn from under it, as shown in Figs. 1 and 2. To prevent this pad from coming all the way out, it has at each end a lug $l$, Fig. 2, that catches against a portion of the carriage-frame. This pad is pushed under the type-letter, the latter depressed to ink the type, and the pad is then withdrawn, and the inked type is then brought down upon the paper to print.

Having thus described my invention, what I claim as new, and desire to secure by Letters Patent, is—

1. A universal letter-type comprising independently-movable block-sections having miter-joints at the corners and each having its face joining onto its neighbor to form a continuous surface and each having a non-rotatable stem rising therefrom with a spiral spring around it, and a back plate supporting said stems and blocks, substantially as shown and described.

2. A universal letter-type comprising independent movable block-sections, the longitudinal members and the transverse members of the letters having at the point of intersection a common movable member adapted to act exclusively with the longitudinal member or exclusively with the transverse member substantially as described.

3. A printing device comprising a universal letter-type having independently-movable printing-blocks abutting against each other and having stems rising therefrom and springs for holding them up, a horizontal roller having projections on its periphery for selecting and depressing the stems, said rollers being arranged in parallel position above the printing-type and being made vertically adjustable with an equal movement at each end, a supporting-frame carrying each end of the roller, means for equally depressing each end of said frame, and means for rotating the roller to enable it to make proper selection substantially as described.

4. A printing device comprising a universal letter-type having independently-movable printing-sections with spring-lifted stems, arranged in rows, and a corresponding set of selecting-rollers having peripheral projections and indentations, said rollers being arranged above the rows of stems and having gear-wheels connecting them for an equal and simultaneous rotary adjustment substantially as described.

5. A printing device comprising a universal letter-type having independently-movable printing-sections with spring-lifted stems attached to the same, said stems being arranged in three rows with the middle row of stems the highest, and three triangularly-arranged rollers with peripheral projections and indentations and connecting-gears, the upper roller being arranged above the row of highest stems substantially as described.

6. A printing device consisting of a universal letter-type having separately-movable printing-sections each provided with upwardly-projecting and spring-lifted stems, a selecting-roller having peripheral projections and indentations arranged in different circular series, means for rotating the roller, and means for shifting the roller lengthwise its axis to bring a different series of projections into range of engagement with the stems substantially as described.

7. A printing device consisting of a universal letter-type having separately-movable printing-sections with upwardly-projecting spring-lifted stems, a frame for said letter-type made vertically adjustable to bring the type into printing contact with the paper, and a frame within said type-frame made vertically adjustable in relation to the type-frame, an adjustable selecting device for picking out the selected sections of the type, said selecting device being carried in the inner frame, springs for holding up the two frames, and means for depressing them, whereby the selecting-device frame descends first to effect the selection of the type-sections and after which the entire type mechanism descends to print the impression as described.

8. A printing device of the kind described having two or more selecting-rollers, and gears for connecting them together, one of said rollers having an extended shaft bearing an index-wheel having letters and numerals displayed thereon and having a correspondingly-notched flange, and a locking-latch engaging with said notched flange to determine the position of the selecting-rollers as described.

9. A printing device of the kind described, having one or more selecting-rollers each provided with a separate circular series of projections and indentations, a frame supporting the journals of the same made adjustable longitudinally with the rollers and having pin $h$, and a locking spring-bar $H'$ with holes $h'$ and knob $h^2$ adapted to fix the longitudinal adjustment of the roller as described.

10. In a printing device of the kind described the combination with the printing type-plate E and its printing devices; of the slotted end plates $G'$ and top plate G, the outside frame-plates $G^2$ with outturned lugs $G^3$, the headed pins $g^4 g^5$ with springs $g^3$ supporting lugs $G^3$, and an independent frame H arranged inside frame $G'$ and carrying the selecting-rollers and means for giving a vertical motion to said frames substantially as described.

11. In a printing device of the kind described, the combination of the frame carrying the printing-type, the independently-movable frame carrying the selecting-rollers, the latter being provided with the horizontal bars $G^7$, and the lever-bail I having cams $i^2$ and the parallel bar $I'$ having corresponding cams substantially as and for the purpose described.

12. In a printing device of the kind described, the combination of the carriage-frame F F' having outturned lugs $F^2$, and the selecting-roller frame $G^2 G^7$ the frame $G'$ having outturned lugs G⁴ carrying vertical headed pins G⁵ and springs F³ coiled around the pin between its head and the outturned lug F² substantially as described.

13. In a printing device of the kind described, the combination of a base-board A, the end frames B B' the rails B², the printing-carriage C mounted thereon, and the paper-feeding mechanism consisting of rubber-faced wheels B⁴ B⁵, the shaft B³ with groove $b$ adjustably connected to wheel B⁵, means for rotating said shaft and the subjacent rollers $b^6$ $b^5$ the latter being made of a length to accommodate the adjustment of wheel B⁵ substantially as described.

14. In a printing device of the kind described, the combination with the base-board A, its pad A', and the paper-feed devices; of the paper-straightening tension wire or cord A² arranged at the front of the base-board substantially as described.

CLARENCE LINCOLN DAWSON.

Witnesses:
J. L. MAGILL,
GEO. H. TREMPSETT.